US009799180B1

(12) United States Patent
Rezayee et al.

(10) Patent No.: US 9,799,180 B1
(45) Date of Patent: *Oct. 24, 2017

(54) MULTIPLEXED TAMPER DETECTION SYSTEM

(71) Applicant: Square, Inc., San Francisco, CA (US)

(72) Inventors: Afshin Rezayee, Richmond Hill (CA); Malcolm Smith, Toronto (CA); Yue Yang, Thornhill (CA)

(73) Assignee: Square, Inc., San Francisco, CA (US)

( * ) Notice: Subject to any disclaimer, the term of this patent is extended or adjusted under 35 U.S.C. 154(b) by 65 days.

This patent is subject to a terminal disclaimer.

(21) Appl. No.: 15/011,367

(22) Filed: Jan. 29, 2016

(51) Int. Cl.
*G08B 13/02* (2006.01)
*G06F 21/60* (2013.01)
*G06F 21/55* (2013.01)
*G06F 21/86* (2013.01)
*G06Q 20/40* (2012.01)

(52) U.S. Cl.
CPC ........... *G08B 13/02* (2013.01); *G06F 21/554* (2013.01); *G06F 21/606* (2013.01); *G06F 21/86* (2013.01); *G06Q 20/4012* (2013.01)

(58) Field of Classification Search
CPC ..... G08B 13/02; G06C 20/4012; G06F 21/86; G06F 21/554; G06F 21/606
See application file for complete search history.

(56) References Cited

U.S. PATENT DOCUMENTS

| | | | | |
|---|---|---|---|---|
| 6,786,420 B1 * | 9/2004 | Silverbrook | ............ | G06K 7/10 235/494 |
| 7,124,170 B1 * | 10/2006 | Sibert | .................. | G06F 12/145 709/216 |
| 7,837,110 B1 | 11/2010 | Hess et al. | | |
| 8,344,881 B1 * | 1/2013 | Hays | .................... | G08B 13/149 340/540 |
| 8,499,173 B2 | 7/2013 | Caci | | |
| 8,786,272 B2 * | 7/2014 | Carapelli | ............... | G07F 7/088 324/71.1 |
| 9,342,717 B2 * | 5/2016 | Claessen | ............ | G06K 7/10267 |

(Continued)

OTHER PUBLICATIONS

Non-Final Office Action mailed Sep. 15, 2016, for U.S. Appl. No. 15/011,347, of Rezayee, A., et al., filed Jan. 29, 2016.

(Continued)

*Primary Examiner* — Mohamed Barakat
(74) *Attorney, Agent, or Firm* — Maynard, Cooper & Gale, LLP; Joshua V. Van Hoven, Esq.

(57) ABSTRACT

A payment reader includes a tamper detection system for monitoring and protecting against attempts to tamper with the payment reader. The tamper detection system includes tamper detection devices such as tamper switches or tamper meshes, and tamper detection circuitry to control and interface with the tamper detection devices. Pulses are selectively provided from each of a plurality of tamper signal pins of the tamper detection circuitry to an associated tamper detection device, the outputs of the tamper detection devices are multiplexed, the multiplexed signal is received at a tamper detection pin, and a tamper attempt is identified if a pulse was not received within the multiplexed signal. While not transmitting, each of the tamper signal pins is switched to an input state, and a tamper attempt is also identified if any aberrant signal is received at the tamper signal pins while in the input state.

28 Claims, 9 Drawing Sheets

(56) References Cited

U.S. PATENT DOCUMENTS

| | | | |
|---|---|---|---|
| 9,665,870 B1 | 5/2017 | Rezayee et al. | |
| 2008/0091605 A1* | 4/2008 | Hughes | G06F 21/31 |
| | | | 705/51 |
| 2012/0056635 A1* | 3/2012 | Oomura | G06F 21/86 |
| | | | 324/713 |
| 2013/0044003 A1* | 2/2013 | Eguro | G06F 21/86 |
| | | | 340/653 |
| 2013/0119974 A1* | 5/2013 | Chamarti | G01R 22/066 |
| | | | 324/110 |
| 2013/0140364 A1 | 6/2013 | McJones et al. | |
| 2015/0097572 A1 | 4/2015 | Wade et al. | |

OTHER PUBLICATIONS

Notice of Allowance mailed Jan. 26, 2017, for U.S. Appl. No. 15/011,347, of Rezayee, A., et al., filed Jan. 29, 2016.

* cited by examiner

MULTIPLEXED TAMPER DETECTION SYSTEM

BACKGROUND

Electronic payments may be performed in a variety ways. A payment terminal may process payment transactions, and may interact with payment devices such as a payment card having a magnetic strip that is swiped in a magnetic reader of the payment terminal, a payment device having a Europay/Mastercard/Visa (EMV) chip that is dipped into corresponding EMV slot of the payment terminal, and near field communication (NFC) enabled devices such as a smartphone or EMV card that is tapped to the payment terminal and transmits payment information over a secure wireless connection. The payment terminal may receive payment information from the payment device as well information about a transaction, and may communicate this information to a payment system for processing of the transaction.

As of a result of its central role in the transaction processing system, the payment terminal is a prime target for third party attackers attempting to access payment information, process fraudulent transactions, and otherwise engage in fraudulent activities or theft. In many cases, the attackers attempt to physically access components of the payment terminal, such as one or more communication lines carrying data or a processor that communicates and processes payment information. Attackers may attempt to eavesdrop on signals (e.g., a passive attack) or to modify or spoof payment processing communications (e.g., an active attack) by injecting malicious signals into the payment terminal.

In an effort to thwart physical attacks, payment terminals may implement tamper detection devices such tamper meshes and tamper switches. For example, if an attacker attempts to remove the cover of the payment terminal, a tamper switch may open. A tamper mesh may include a conductive trace that effectively covers sensitive components such as the processor or other circuitry of the payment terminal. If an attacker attempts to access the sensitive components (e.g., by drilling a small hole into the payment terminal), the conductive trace may be broken, resulting in an open circuit. The open circuit of the tamper switch or tamper mesh may be sensed by circuitry of the payment terminal, which may shut off the payment terminal or take other corrective action.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
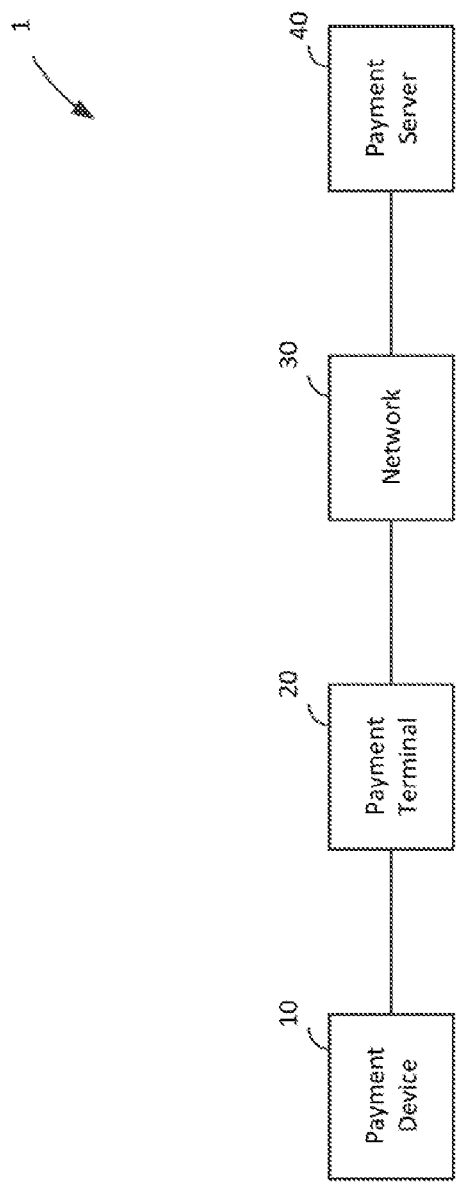
FIG. 1 shows an illustrative block diagram of a payment system in accordance with some embodiments of the present disclosure.

An electronic payment terminal such as a payment reader may interface with various types of payment devices. For example, smart phones and smart watches have NFC payment applications that allow a customer to "tap" in close proximity to the payment terminal in order to pay. Payment information is transmitted and received wirelessly over a radio frequency (RF) connection between the payment device and the payment reader. EMV cards include an EMV chip that is "dipped" into a slot in the payment reader. The EMV card typically remains in the reader, and communicates with the payment reader through a physical electrical connection. Once the transaction is complete, the EMV card may be removed. Also, many payment cards retain traditional "swipe" technology in which information about a payment card is transferred to the payment reader by swiping a magnetic card stripe through a magnetic reader of the payment reader.

In all of these scenarios, there are multiple opportunities for an attacker to attempt to obtain the payment information in order to steal payment data or otherwise engage in fraudulent transactions. For example, an attacker may attempt to intercept NFC communications, read data being communicated over the physical connections with the EMV card, or intercept that data from the magnetic stripe of a traditional swiping transaction. Moreover, signals carrying this and other critical information are transmitted within the payment reader and processed by processors and other circuitry of the payment reader.

Accordingly, numerous types of tamper detection devices such as tamper switches and tamper meshes are integrated into an exemplary payment reader. These tamper detection devices can sense attempts to gain improper physical access to the payment reader (e.g., by opening the payment reader or drilling into the payment reader to access signals or components), attempts to physically provide electrical signals to the payment reader (e.g., attempts to inject malicious signals into externally accessible pins of the payment reader, such as EMV pins), and attempts to wirelessly introduce malicious signals to the payment reader. Some tamper detection devices may open a circuit in response to tamper attempt.

The payment reader includes tamper detection circuitry for interacting with and controlling the various types of tamper detection devices. In some embodiments, Each tamper detection device is associated with two tamper pins. The tamper detection circuitry transmits a signal such as a random sequence of pulses from one of the tamper pins, which if received by the associated tamper pin via the associated tamper detection device, indicates that the tamper detection device has not detected a tamper attempt. Conversely, if any of the pulses are not received, it is likely that there has been a tamper attempt.

Tamper attempts may also be sensed by tamper pins that are not currently transmitting or receiving pulses. Each of these tamper pins may be switched to an input state, and if a signal is received at any of these tamper pins, it is likely that there has been a tamper attempt. When it is time for any tamper pin to send a pulse to its associated tamper detection device, it can switch back to the output state.

In some embodiments, a number of tamper detection devices may be multiplexed to a single tamper pin, which may be referred to as a tamper detection pin. Thus, while a tamper pin that outputs a signal or pulses (e.g., a tamper signal pin) may be associated with each tamper detection device, the outputs of multiple tamper detection devices (i.e., the outputs received from each tamper signal pin) are received at a single tamper detection pin. Tamper detection logic of the tamper detection circuitry demultiplexes and processes the received data. Each of the tamper signal pins may also be switched to an input state while not transmitting, thus providing additional possibilities for sensing tamper attempts.

FIG. 1 depicts an illustrative block diagram of a payment system 1 in accordance with some embodiments of the present disclosure. In one embodiment, payment system 1 includes a payment device 10, payment terminal 20, network 30, and payment server 40. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 is depicted as a single simplified block, it will be understood that payment server 40 may include any suitable number of servers operated by any suitable entities, such as a payment service system and one or more banks of the merchant and customer. The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment reader, for example, at a screen of a payment terminal. In other embodiments such as a smart phone or smart watch operating as an NFC payment device, information about the approved transaction and additional information (e.g., receipts, special offers, coupons, or loyalty program information) may be provided to the NFC payment device for display at a screen of the smart phone or smart watch or for storage in memory of the smart phone or smart watch.

Each of these components of payment system 1 may provide an opportunity for an attacker to eavesdrop on payment and transaction information or to inject malicious signals into the payment system 1. For example, an attacker may attempt to monitor signals that are relayed between any of payment device 10, payment terminal 20, network 30, and payment server 40. In other attacks, an attacker may attempt to substitute a counterfeit component for one of the components of payment system 1, for example, by creating a counterfeit payment device 10 or payment terminal 20, or by attempting to intercept or redirect communications to network 30 or payment server 40. In yet other attacks, an attacker may attempt to modify one of the components of the payment system 1, for example, by modifying one or more of the payment device 10, payment terminal 20, or payment server 40 to eavesdrop or inject malicious signals.

Figure 2:
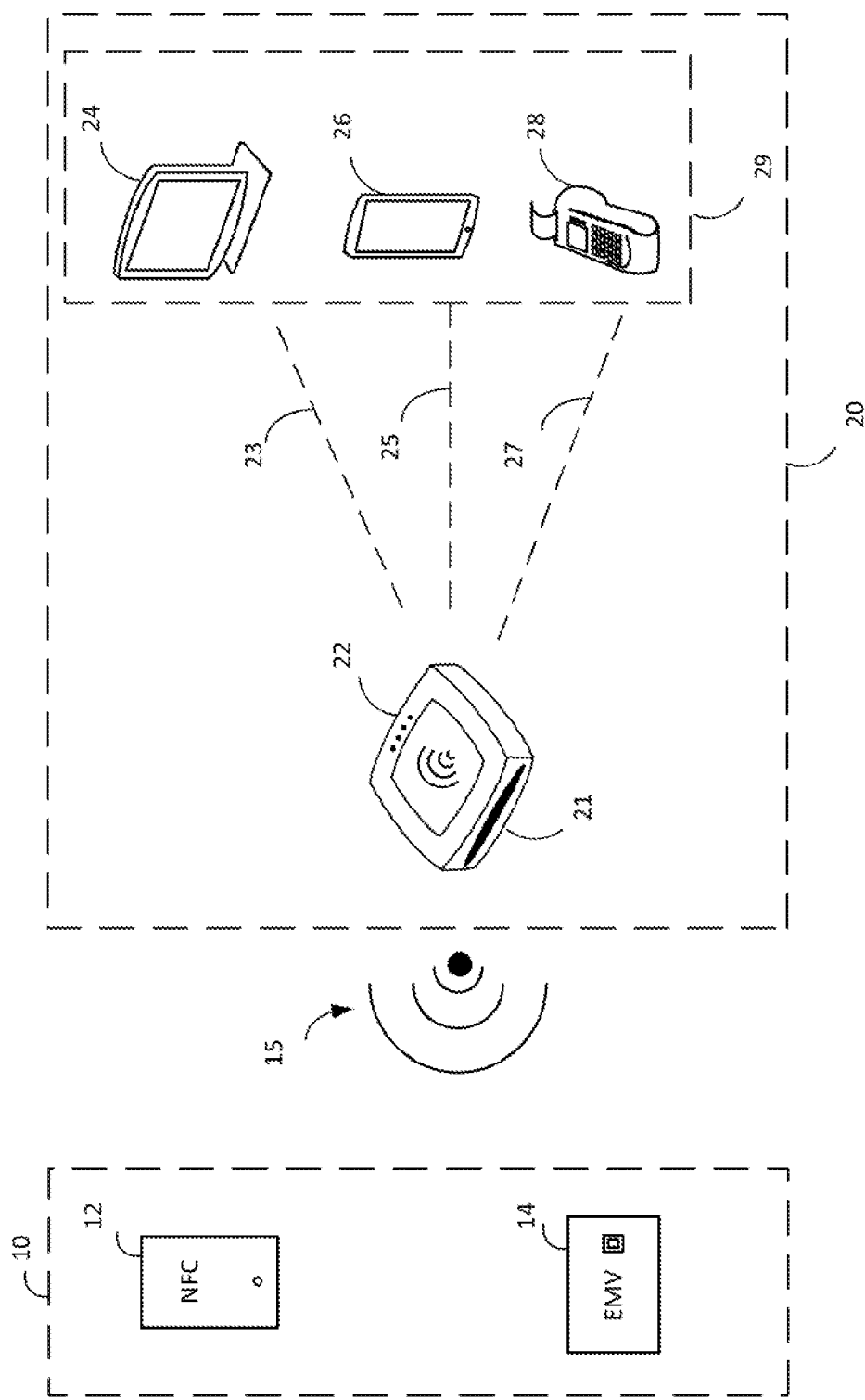
FIG. 2 depicts an illustrative block diagram of a payment device and payment reader in accordance with some embodiments of the present disclosure.

FIG. 2 depicts an illustrative block diagram of payment device 10 and payment reader 20 in accordance with some embodiments of the present disclosure. Although it will be understood that payment device 10 and payment reader 20 of payment system 1 may be implemented in any suitable manner, in one embodiment the payment reader 20 may comprise a payment reader 22 and merchant device 29. The reader 22 of payment terminal 20 may facilitate transactions between the payment device 10 and a merchant device 29 running a point-of-sale application.

In one embodiment, payment device 10 may be a device that is capable of communicating with payment terminal 20 (e.g., via payment reader 22), such as an NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15 it is inductively coupled to the payment reader 22. Thus, the payment device 10 is also capable of modulating the wireless carrier signal via active or passive load modulation. By changing the tuning characteristics of the antenna of payment device 10 (e.g. by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or dedicated payment terminal 28. In the case of a computing device such as tablet payment device 24 or mobile payment device 26, a point-of-sale application may provide for the entry of purchase and payment information, interaction with a customer, and communications with a payment server. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, lightning) or wireless (e.g., Wi-Fi, Bluetooth, NFC, or ZigBee) connection, in one embodiment payment reader 22 may communicate with the merchant device 29 via a Bluetooth or Bluetooth low energy interface. As described herein, in some embodiments processing of the payment transaction may occur locally on payment reader 22 and merchant device 29, for example, when a transaction amount is small or there is no connectivity to the payment server. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format.

Payment reader 22 may provide a particularly appealing target for an attacker, since, as described above, it provides a central point for receiving payment via multiple interfaces and for communicating that information with other devices (e.g., merchant device 29) and thus the payment server 40 through network 30. Attackers may attempt to tamper with payment reader 22 in order to access internal electrical connections that carry signals to the various payment interfaces or communication interfaces, or processors or other circuitry of payment reader 22. Accordingly, payment reader 22 may include numerous mechanisms for monitoring and preventing attempts to tamper with the hardware of payment reader 22. For example, payment reader 22 may include tamper switches that change their electrical state in response to an attempt to open the housing of payment reader 22, insert a device other than a payment card into payment slot 21 or a magnetic stripe reader, place an improper device in proximity to the NFC interface of payment reader 22, or otherwise gain physical or electrical access to any components of payment reader 22.

In some embodiments, a tamper switch may be a component that changes its electrical state in response to a physical stimulus. Exemplary tamper switches may be located at various locations of a payment reader 22, such that any attempt to open the enclosure of payment reader 22, or to modify the physical structure of payment reader 22, may cause the tamper switch to change its physical state (e.g., resulting in an open circuit).

In some embodiments, a tamper switch may be a component that changes its electrical state in response to an electrical stimulus. An exemplary payment reader 22 may have a number of connection points at which it is possible to apply an electrical signal to the connection points. For example, in some embodiments a payment slot 21 of payment reader 22 may have EMV pins that interface with corresponding pins of an EMV card. An attacker may attempt to access those pins to monitor the pins (e.g., the I/O pin) or to provide malicious signals to payment reader 22 (e.g., by spoofing an EMV card). In some embodiments, a tamper switch may respond to signals that do not match expected signal characteristics (e.g., current, voltage, duty cycle, waveform, capacitance, etc.) and modify its electrical state (e.g., by opening a circuit, closing a circuit, modifying an electrical signal's amplitude or phase, etc.). Although such a tamper switch has been described in the context of the pins of an EMV payment slot 21, it will be understood that such a tamper switch may be implemented on any electrical signal lines or connections of payment reader 22.

In some embodiments, an attacker may attempt an attack that does not require physical access to the payment reader 22, for example, by sending radio frequency (RF) electromagnetic signals in order to create or modify a signal within payment reader 22, or to temporarily or permanently disable or modify the operation of one or more components of the payment reader 22. An exemplary tamper switch may respond to sensed characteristics of RF signals that are abnormal or correspond to an attack, such as a signal strength, waveform, frequency, duty cycle, etc. In response to such sensed characteristics the tamper switch may modify its electrical state (e.g., by opening a circuit, closing a circuit, modifying an electrical signal's amplitude or phase, etc.).

A tamper mesh may provide for a complete enclosure of the payment reader 22 or critical components thereof. In some embodiments, a tamper mesh may include conductive traces in close proximity and creating a pattern that covers the protected components. It may be difficult to gain physical access to the components without damaging the conductive mesh due to the unique and dense pattern of the tamper mash. This results in a change in the electrical state of the tamper mesh (e.g., by opening a circuit, closing a circuit, modifying an electrical signal's amplitude or phase, etc.) that may be used to sense a tamper attempt and take corrective action.

Figure 3:
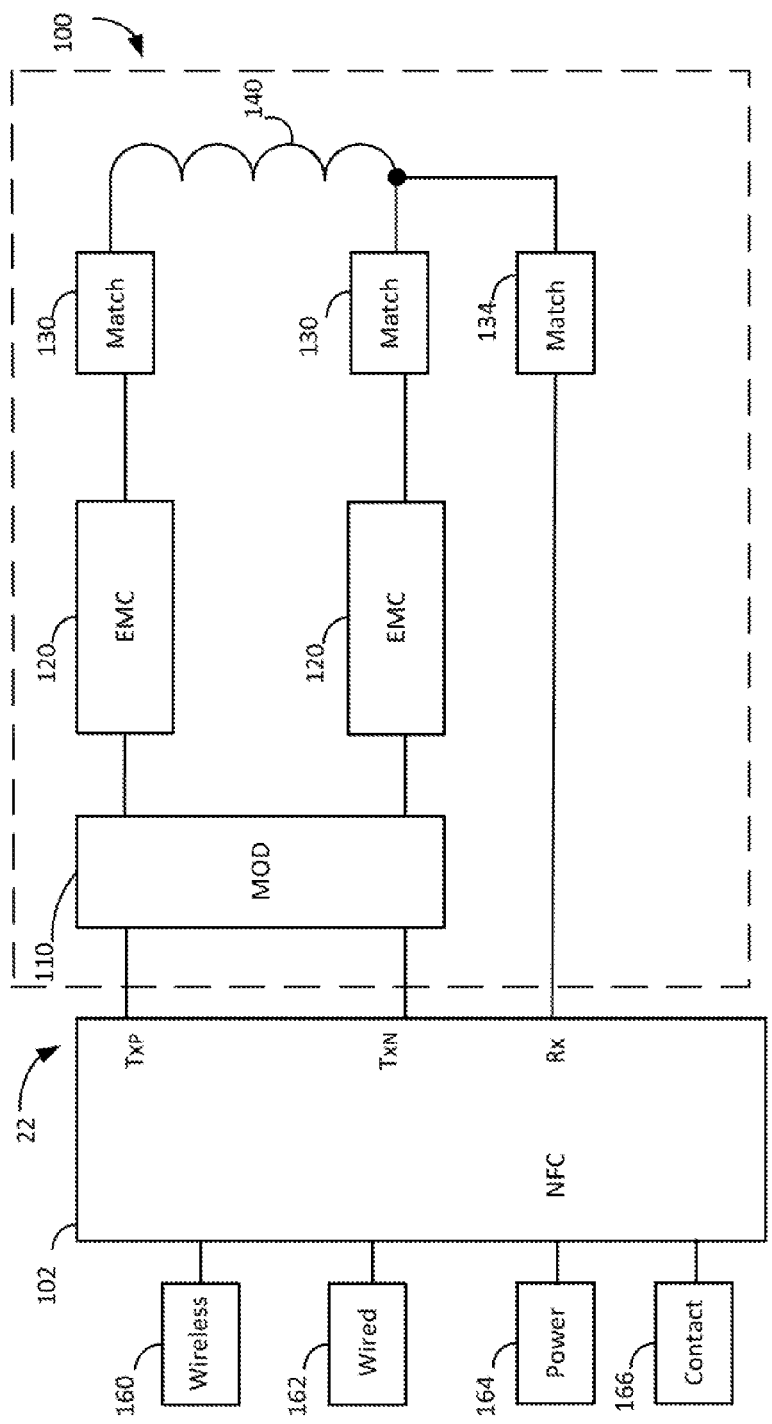
FIG. 3 depicts a block diagram of a payment reader in accordance with some embodiments of the present disclosure.

FIG. 3 depicts a block diagram of payment reader 22 in accordance with some embodiments of the present disclosure. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in any suitable manner. Among other functions, payment reader 22 may operate as a NFC communication device for exchanging data with a contactless payment device such payment device 10. In one embodiment, payment reader 22 includes payment processing chip 102, NFC circuit 100, wireless communication interface 160, wired communication interface 162, power supply 164, and contact interface 166. Although the NFC circuit 100 and the contact interface 166 are examples of types of payment interfaces that may be included within payment reader 22, it will be understood that any suitable payment interface (e.g., a magnetic card reader) may be included within payment reader 22 in accordance with the embodiments of the present disclosure.

Payment processing Chip 102 of payment reader 22 may include any suitable hardware, software, memory, and circuitry as is necessary to perform and control the functions of payment reader 22. In one embodiment, payment processing chip 102 includes one or more processors that execute instructions stored in memory of payment processing chip 102 to control the operations and processing of payment reader 22. As used herein, a processor may include one or more processors having processing capability necessary to perform the processing functions described herein, including but not limited to hardware logic, computer readable instructions running on a processor, or any suitable combination thereof. A processor may run software to perform the operations described herein, including software accessed in machine readable form on a tangible non-transitory computer readable storage medium, as well as software that describes the configuration of hardware such as hardware description language (HDL) software used for designing chips.

In one embodiment, payment processing chip 102 may include two RISC processors configured to perform general processing and cryptographic processing functions, respectively, based on executable instructions stored in respective memory. As used herein, memory may refer to a tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Payment processing chip 102 may also include additional circuitry such as interface circuitry, analog front end circuitry, and security circuitry. In one embodiment, interface circuitry may include circuitry for interfacing with a wireless interface 160 (e.g., Wi-Fi, Bluetooth, and Bluetooth low energy), circuitry for interfacing with a wired interface 162 (e.g., USB, Ethernet, FireWire, and lightning), circuitry for interfacing with other communication interfaces or buses (e.g., I²C, SPI, UART, and GPIO), circuitry for interfacing with power interface 164 (e.g., power management circuitry, power conversion circuitry, rectifiers, and battery charging circuitry), and circuitry for interfacing with contact interface 166 (e.g., power and communication circuitry for interfacing with an EMV chip of a chip card 14).

In one embodiment, analog front end circuitry of payment processing chip 102 includes circuitry for interfacing with the analog components of NFC circuit 100 (e.g., electromagnetic compatibility (EMC) circuitry, matching circuits, and modulation circuitry). Security circuitry of payment processing chip 102 may include the circuitry for protecting sensitive information such as encryption keys, merchant information, and customer information. In one embodiment, security circuitry may include a tamper detection system (e.g., including tamper detection circuitry including tamper detection devices such as tamper switches and tamper meshes) and electronic fuses for selectively cutting off power or disabling one or more components of payment processing chip in response to attempts to obtain improper access to payment processing chip 102, as described in more detail herein.

Wireless interface 160 includes hardware and software for communicating with external electronic devices wirelessly, such as Wi-Fi, Bluetooth, or Bluetooth low energy. Wired Interface 162 includes hardware, software, and a physical interface to facilitate wired communications with an external electronic device via an interface such as USB, Ethernet, FireWire, or lightning. Using the wireless interface 116 and wired interface 162, payment reader 22 may communicate with external electronic devices such as a merchant device 29. In some embodiments, payment reader 22 may communicate with other electronic devices such as a remote server, (e.g., to provide payment or transaction information directly to the server, receive updates from a server, or communicate certification or approval data with the server), or with another electronic device.

Power supply 164 may include one or more power supplies such as a physical connection to AC power or a battery. Power supply 164 may include power conversion circuitry for converting AC power and/or generating a plurality of DC voltages for use by components of payment reader 22. When power supply 164 includes a battery, the battery may be charged via a physical power connection, via inductive charging, or via any other suitable method.

Contact interface 166 may be a suitable interface for providing power to a payment chip such as an EMV chip of a chip card 14 and communicating with the EMV chip. Contact Interface 166 may include a plurality of contact pins (not depicted in FIG. 3) for physically interfacing with the chip card 14 according to EMV specifications. In some embodiments, contact interface 166 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins.

Payment processing chip 102 of payment reader 22 is in communication with NFC circuit 100 via a plurality of pins such as a positive transmit pin (T y), negative transmit pin ($T_{XN}$), and a receive pin ($R_X$). Transmit pins $T_{XP}$ and $T_{XN}$ may provide output signals having an amplitude, frequency, and waveform. In one embodiment, the signals provided from $T_{XP}$ and $T_{XN}$ may be differential square wave signals and may be provided to modulation circuitry 110 of NFC circuit 100.

Modulation circuit 110 may include circuitry (e.g., H-bridge circuitry) for outputting a modulated signal in accordance with the outputs of $T_{XP}$ and $T_{XN}$. Modulation circuit 110 may also perform other functions such as applying an increased voltage that is suitable for transmission over antenna 140. The output of modulation circuit 110 may be provided to EMC circuit 120. EMC circuit 120 may include one or more components such inductors and capacitors in order to provide acceptable electromagnetic compatibility with other high-frequency signals. The output of EMC circuit 120 may be provided to matching circuit 130. Matching circuit 130 may include suitable components such as resistors, inductors, and capacitors to provide for impedance matching and tuning of antenna 140.

Collectively, the modulation circuit 110, EMC circuit 120, and matching circuit 130 may form a transmit circuit that is coupled to antenna 140. However, it will be understood that the transmit circuit may include any suitable circuitry that inductively couples the payment processing chip 102 (e.g., the outputs of the processing unit thereof as indicated by the $T_{XP}$ and $T_{XN}$ pins), that the circuit components depicted in FIG. 3 may be arranged in any suitable manner, and that any suitable components may be added or omitted therefrom.

During operation of payment processing chip 102 of payment reader 22, transmit pins $T_{XP}$ and $T_{XN}$ may output either a carrier signal or a modulated signal. A carrier signal may be a signal having a fixed frequency such as 13.56 MHZ. The carrier signal is provided to modulation circuit 110 which may modify the output signal from payment processing chip 102 in a uniform manner (e.g., by applying a voltage boost). Components of EMC circuit 120 and matching circuit 130 (e.g., resistors, inductors, and capacitors) modify the output waveform of the carrier signal, for example, by modifying the approximate square wave output such that the signal transmitted by the antenna 140 approximates a sine wave having the carrier frequency. A first portion of the transmit circuit thus couples the output of the $T_{XP}$ pin to a first terminal of antenna 140 while a second portion of the transmit circuit couples the output of the $T_{XN}$ pin to a second terminal of antenna 140. The carrier signal is then transmitted over antenna 140 as a wireless carrier signal.

When modulation is applied to the carrier signal by payment processing chip 102, modulation circuit 110 may output a modulated signal that varies from the carrier signal in its amplitude, phase, or both in response to a data signal. Payment processing chip 102 may implement a modulation procedure in order to generate the modulated signal, either alone or in combination with the modulation circuit 110. This modulated signal is provided to the transmit circuit and transmitted over antenna 140 as a wireless data signal.

Payment processing chip 102 monitors the signal at antenna 140 through receive pin $R_X$. The receive pin $R_X$ is coupled to a receive circuit, which in one embodiment may include matching circuit 134 and may be coupled to a second terminal of antenna 140. In this manner, payment processing chip 102 may monitor what is being transmitted (e.g., the wireless carrier and modulated signals) as well as changes that are applied to the carrier signal by a contactless payment device 10 such as NFC device 12 or chip card 14. Based on these modulations of the received signal, payment processing chip 102 is able to receive communications from the contactless payment device 10.

Figure 4:
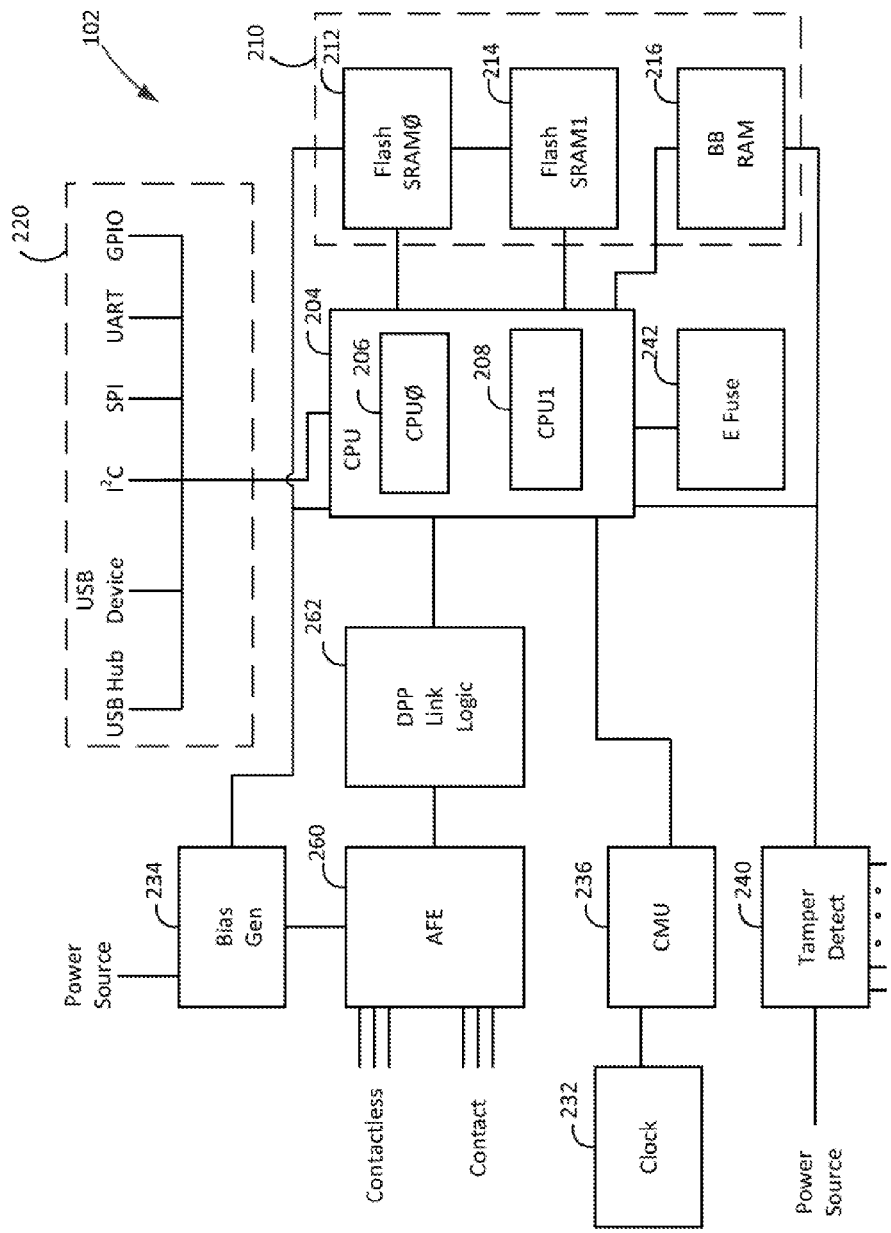
FIG. 4 depicts a block diagram of components of a payment processing chip in accordance with some embodiments of the present disclosure.

FIG. 4 depicts a block diagram of components of payment processing chip 102 in accordance with some embodiments of the present disclosure. Although particular components are depicted in a particular configuration in FIG. 4, it will be understood that payment processing chip 102 may include additional components, certain components may not be included in payment processing chip 102, and components of payment processing chip 102 may be rearranged in any suitable manner.

In one embodiment, payment processing chip 102 may include a processing unit 204 and memory 210. In one embodiment, processing unit 204 may include two CPUs labeled as CPU0 206 and CPU1 208. CPU0 206 may be a general processor that controls most functions of the payment processing chip 102. CPU 208 may be a cryptographic processor that is physically separated from other components of payment processing chip 102 (not depicted) such that even if one or more components of payment processing chip 102 (e.g., CPU0 206) are compromised, the processor CPU1 208 and its associated memory (e.g., flash SRAM1 214) of the cryptographic unit may not be compromised.

In one embodiment, CPU0 206 and CPU1 208 may be RISC processors. Although memory 210 may include any suitable memory, in one embodiment each of CPU0 206 and CPU1 208 may have associated flash SRAM such as flash SRAM0 212 and flash SRAM1 214, respectively. Flash SRAM0212 and flash SRAM1 214 may store instructions for execution on respective CPUs CPU0 206 and CPU1 208 and may also store data for use during operation of payment processing chip 102. Battery-backed RAM 216 may be a separate memory that stores highly sensitive information such as encryption keys. In this manner, if payment processing chip 102 is compromised, the information stored in battery-backed RAM 216 may be erased, for example, by removing power to battery-backed RAM 216.

Processing unit 204 (e.g., CPU0 206 of processing unit 204) may interface with one or more communication interfaces 220. Communication interfaces 220 may enable communication with external devices and other circuitry of payment reader 22. For example, communication interfaces 220 may enable communications with circuitry of payment reader 22 such as wireless communication circuitry (e.g., Wi-Fi, Bluetooth, Bluetooth low energy), power management circuitry of payment reader 22, wired communication interfaces of payment reader 22 (e.g., Ethernet, USB, FireWire, lightning) and other components of payment reader 22. Exemplary communication interfaces 220 include a USB hub, USB device, $I^2C$, SPI, UART, and GPIO.

Payment processing chip 102 also includes bias generator 234, clock 232, clock management unit 236, tamper detect system 240, and electronic fuse 242. Bias generator 234 may be connected to a power source and may generate a bias voltage that is provided to components of payment processing chip 102 such as analog front end 260, processing unit 204, and memory 210. In one embodiment, a suitable bias voltage generated by bias generator 234 may be 3.3 volts. Clock 232 may be any suitable clock such as a crystal oscillator and may provide a clock signal at a clock frequency to clock management unit 236. Clock management unit 236 may generate a plurality of clock signals based on the input from clock 232, for example, to provide a clock signal for CPU0 206 and CPU1 208 of processing unit 204 and a clock signal having a suitable frequency for transmission for near field communications (e.g., 13.56 MHZ).

Tamper detection system 240 may be directly connected to the power source (depicted in FIG. 4), or in some embodiments, may interface with additional circuitry that provides power to other components of payment processing chip 102. Tamper detection system 240 includes tamper detection circuitry and tamper detection devices (e.g., tamper switches and tamper meshes). If the tamper detection system determines that a tamper attempt has occurred, this information may be utilized corrective action in response to the tamper attempt. In an embodiment, the corrective action may include shutting off power to one or more components of payment processing chip 102. Although tamper detection system 240 is depicted in communication with only processing unit 204 and battery backup RAM 216, it will be understood that tamper detect 240 may provide interruption of power to any other component of payment processing chip 102 such as flash SRAM0 212 and flash SRAM1 214. In some embodiments, the corrective action may vary based on the type of tamper event that has occurred, the type of tamper detection device that indicates the tamper event, the number of simultaneous tamper events, a frequency of tamper events, tamper event timing, phase of tamper event signals, a tamper event history, or any other suitable metric.

In some embodiments, the tamper detection system 240 may include input and output lines to communicate with other components of payment processing chip 102 (e.g., one or both of CPU0 206 and CPU1 208). For example, rather than shutting down components of payment processing chip 102, in some embodiments, tamper detect system 240 may identify tamper attempts that may be reported to CPU0 206 and CPU1 208, or to an external system (e.g., payment server 40) for storage, analysis, and complex or intelligent processing of the tamper event. In some embodiments, such an external analysis may result in a signal being received at an input of the tamper detection system 240, which may shut off power to one or more components of payment processing chip 102 in response to that input.

Payment processing chip 102 also includes electronic fuses 242. Electronic fuses 242 may be provided to disable power or communications to one of more components of payment processing chip 102. For example, electronic fuses 242 may be controlled by CPU1 208. In the event that an improper access attempt or usage of payment processing chip 102 is identified by CPU1 208, CPU1 may activate one or more electronic fuses 242 in order to shut off power to one or more components of payment processing chip 102, to shut off the clock signal to one or more components of payment processing chip 102, or to shut off communications between one or more components of payment processing chip 102. For example, CPU1 208 may control a subset of electronic fuses 242 in a manner such that CPU0 206 is unable to operate or communicate with CPU1 208. In some embodiments, CPU1 208 may control electronic fuses 242 based at least in part on information received from tamper detection system 240, payment server 40 (e.g., based on data relating to tamper events), or any other suitable component of payment reader 22 or external system.

Payment processing chip 102 also includes analog front end 260 and DPP link logic 262. DPP link logic 262 may provide an interface between the digital signals from CPU0 206 of processing unit 204 and the analog signals of analog front end 260. Analog front end 260 provides the interface to the contactless interface (e.g., the NFC circuit 100) and to a contact interface for chip cards.

During operation, clock 232 provides a clock signal to CMU 236, which provides a plurality of clock signals to processing unit 204. Tamper detection system 240 monitors the tamper detection devices, and in the absence of a tamper attempt power may be supplied to components of payment processing chip 102 in a normal manner. In the absence of any improper attempt to access payment processing chip 102, CPU1 208 may control electronic fuse 242 such that the components of payment processing chip 102 are able to operate normally.

The merchant device 29 may be in communication with Bluetooth communication circuitry of payment reader 22, which may be in communication with CPU0 206 via communication interface 220. In one embodiment, merchant device 29 may transmit a request to receive payment to payment processing chip 102 which may be received by CPU0 206. CPU0 206 may process the request according to instructions stored in flash SRAM0 212 and may activate one or both of the contactless interface (e.g., NFC circuit 100) or the contact interface via DPP link logic 262 and analog front end 260. With respect to the contactless interface, CPU0 206 may function as a near field communication initiator, providing a carrier signal and modulated signal via DPP link logic 262, analog front end 260, and contactless interface. CPU0 206 may monitor for a response from a target (e.g., NFC device 12 or EMV device 14) via the contactless interface, analog front end 260, and DPP link logic 262.

Once communication is established with a payment device such as either a contactless device (e.g., an NFC device or a chip card) via the contactless circuit or a contact card via the contact interface, CPU0 206 may communicate with the payment device to process a payment transaction. During this process CPU0 206 may communicate with CPU1 208 in order for CPU1 208 to perform cryptographic functions. In some embodiments, CPU0 206 and CPU1 208 may process a transaction locally, while in some embodiments CPU0 206 may communicate with the merchant device 29 or directly with a payment server 40 via communication interface 220 and associated communication circuits (e.g., Wi-Fi, Bluetooth, Ethernet).

Figure 5:
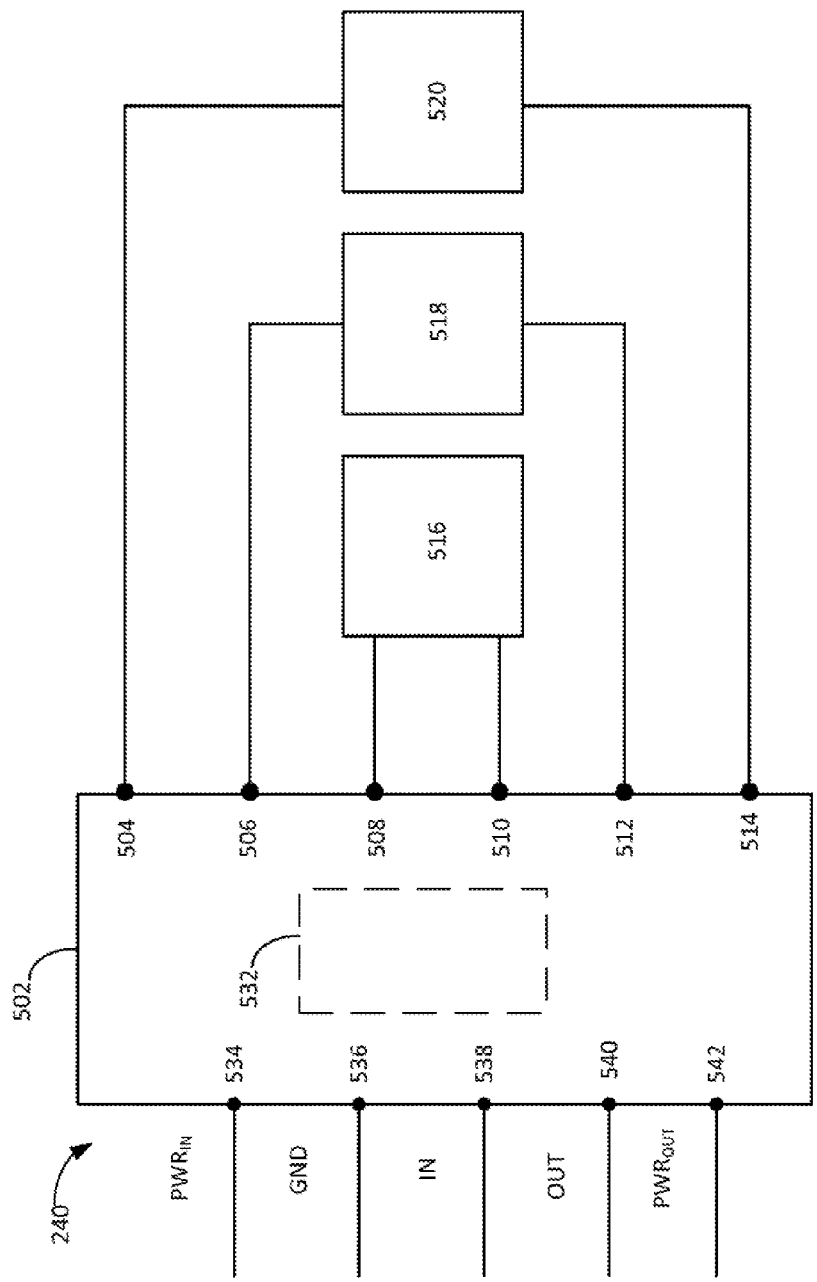
FIG. 5 depicts an exemplary tamper detection system in accordance with some embodiments of the present disclosure.

FIG. 5 depicts an exemplary tamper detection system 240 in accordance with some embodiments of the present disclosure. Although a tamper detection system 240 may include any suitable components in accordance with the present disclosure, in some embodiments, tamper detection system 240 may include tamper detection circuitry 502 and tamper detection devices 516, 518, 520. Each of tamper detection devices 516, 518, and 520 may be any suitable tamper detection devices such as tamper switches, tamper meshes, or any combination thereof. Although three tamper detection devices 516, 518, and 520 are depicted in FIG. 5, it will be understood that any suitable number of tamper detection devices, and any suitable combination of tamper detection device types, may be implemented within a tamper detection system 240 in accordance with the present disclosure.

Although tamper detection circuitry 502 may include any suitable components, in an embodiment, tamper detection circuitry may include tamper detection logic 532, tamper pins 504, 506, 508, 510, 512, and 514, power input pin 534, ground pin 536, input signal pin 538, output signal pin 540, and power output pin 542. Tamper detection logic 532 may include hardware logic, software logic, or any suitable combination thereof (e.g., a processing unit in combination with memory and hardware logic) as described herein that performs the control, processing, communication, signal generation, and other functions necessary for the operation of the tamper detection system.

In some embodiments, tamper detection logic 532 generates signals such as sequences of pulses that are output to one or more of the tamper pins 504, 506, 508, 510, 512, and 514 (e.g., to tamper pins 504, 506, and 508). Each pulse of a sequence of pulses is transmitted during a time period associated with the sequence of pulses. That sequence of pulses may be provided to a respective electrical connection point of a respective tamper detection device (e.g., tamper detection device 516, 518, and 520) and in the absence of a tamper event, received at an associated tamper pin (e.g., tamper pin 510, 512, and 514) from a second electrical connection point of each of the tamper detection devices. If the sequence of pulses is received during the correct time periods, tamper detection logic 532 may determine that a tamper event has not occurred. In other embodiments, the tamper detection device may operate in a different manner (e.g., the tamper detection device may close a circuit in response to a tamper attempt). In such embodiments, it may be determined that a tamper event has occurred if the pulses are received.

As attackers are becoming more sophisticated, they may identify ways to bypass tamper detection devices. For example, an attacker may attempt to mimic the sequence of pulses that is output from an output tamper pin (e.g., tamper pin 504, 506, or 508) and provide that sequence of pulses at the associated input tamper pin (e.g., tamper pin 510, 512, or 514). An attacker may also attempt to quickly bypass a tamper detection device, which may result in a temporary or persistent transient or short-circuit condition, but which does not result in an open circuit as would typically occur as a result of the tamper event.

In some embodiments, tamper detection logic 532 may utilize more complex tamper detection techniques in order to identify more sophisticated attacks. In an embodiment, tamper detection logic 532 may provide each sequence of pulses as a random sequence of pulses (e.g., with the times when the pulses are sent being the time periods for the sequence of pulses) or random sequence of pulse amplitudes (e.g., the amplitudes of pulses may be randomly varied). Because the pulses are provided randomly, it may be more difficult for an attacker to mimic the sequence of pulses.

In some embodiments, the sequence of pulses may also be provided to each of the tamper detection devices (e.g., tamper detection device 516, 518, and 520) during mutually exclusive time periods. In this manner, a transient voltage or short circuit caused by an attacker may be less likely to align with an expected pulse. In some embodiments, the tamper detection logic 532 may perform complex signal analysis on a received sequence of pulses. For example, by examining waveforms, voltages, frequencies, duty cycles, current, and other electrical characteristics of the received sequence of pulses, tamper detection logic 532 may identify sophisticated attacks. In some embodiments, tamper detection circuitry 502 may include additional circuitry to facilitate such analysis. It will also be understood that any combination of the techniques described herein may be utilized in accordance with the present disclosure.

In an embodiment, some or all of the tamper pins 504, 506, 508, 510, 512, and 514 may operate in both an input state and an output state. When discussed herein, an input state may include any suitable input state, such as a high-impedance input state. This allows tamper detection logic 532 to transmit a tamper detection signal such as a random sequence of pulses or random sequence of pulse amplitudes from each of the tamper pins 504, 506, 508, 510, 512, and 514, making attacks and attempts to bypass the tamper detection logic more difficult. In an exemplary embodiment, tamper detection logic 532 may provide the sequences of pulses during mutually exclusive time periods to each of the tamper pins 504, 506, 508, 510, 512, and 514. Although in embodiments discussed herein, the pulses may be high pulses (e.g., pulses that increase the voltage at the tamper pin), it will be understood that these embodiments could be modified such that low pulses (e.g., pulses that decrease the voltage of the tamper pin) are provided at the tamper pin.

Whenever one of the tamper pins (e.g., tamper pin 504) is transmitting the sequence of pulses, each of the other tamper pins (e.g., tamper pins 506, 508, 510, 512, and 514) may be switched to an input state. With such a sequence, only the tamper pin associated with the tamper pin outputting the sequence of pulses (e.g., tamper pin 514, associated with tamper pin 504) should receive any signal during the time periods associated with that sequence of pulses, and that received signal should be the sequence of pulses. If the associated tamper pin (e.g., tamper pin 514) does not receive the sequence of pulses, or if the received signal is aberrant in any way, tamper detection logic 532 may identify a tamper event. Similarly, none of the other tamper pins (e.g., tamper pins 506, 508, 510, and 512) should receive any input signal during this time (e.g., while tamper pin 504 is outputting and tamper pin 514 is receiving pulses. If the sequence of pulses or any transient signal is received by these other tamper pins, this may indicate a tamper attempt or an attempt to bypass the tamper detection devices. Thus, by employing some or all of the non-transmitting pins as inputs, different types of tamper attempts may be detected.

In other embodiments such as normally open tamper detection devices, whenever one of the tamper pins (e.g., tamper pin 504) is transmitting the sequence of pulses, each of the other tamper pins (e.g., tamper pins 506, 508, 510, 512, and 514) may be switched to an input state. None of the tamper pins should receive the sequence of pulses. If the associated tamper pin (e.g., tamper pin 514) receives the sequence of pulses, or if any aberrant signal is received at the associated tamper pin, tamper detection logic 532 may identify a tamper event. None of the other tamper pins (e.g., tamper pins 506, 508, 510, and 512) should receive any input signal during this time (e.g., while tamper pin 504 is outputting pulses). If the sequence of pulses or any transient signal is received by these other tamper pins, this may indicate a tamper attempt or an attempt to bypass the tamper detection devices. Thus, by employing some or all of the non-transmitting pins as inputs, different types of tamper attempts may be detected.

The sequences of pulses provided by the tamper detection circuitry 502 is also less predictable, since the pulses may originate from not only half of the pins, but all of the pins, and because sensing occurs at some or all of the non-transmitting pins. In this manner, it may be more difficult for an attacker to mimic or bypass the tamper detection system 240. Although signals have been described as being random sequences of pulses provided at mutually exclusive times, it will be understood that any suitable signal and sequencing may be provided in accordance with the present disclosure. In some embodiments, tamper detection logic 532 may modify any suitable signal characteristic of the transmitted signals, including pulse width, waveform, duty cycle, frequency, type of signal (random vs. data), amplitude, or any other suitable signal characteristic. The tamper detection logic may transmit signals from multiple tamper pins at the same time, and switch any suitable number of tamper pins to input pins at any suitable time. Any of these modifications may be done according to logic that introduces varying degrees of randomness, and which may be updated to implement routines for newly identified types of attacks.

In some embodiments, tamper detection circuitry 502 may include a power input 534, a ground 536, and a power output 542. In one embodiment, power input 534 and ground 536 may provide power to the tamper detection circuitry 502. Power output 542 may provide power to other components of the payment reader 22, such that in response to detection of a tamper even by tamper detection logic 532, power can be shut off to one or more components of payment reader 22. Tamper detection circuitry may also include input pin 538 and an output pin 540, to enable communications with other components of payment reader 22 (e.g., CPU0 206 or CPU1 208) or an external device (e.g., merchant device 29, payment server 40). Although input pin 538 and output pin 540 are depicted in FIG. 5, it will be understood that tamper detection circuitry 502 may communicate with an external device via any suitable physical or wireless interface using any suitable protocol.

By communicating with an external device, in some embodiments, some aspects of the tamper detection processing may be offloaded to the external components, device, or devices. In an embodiment, tamper detection logic 532 may collect data about tamper events and transmit the data to an external device via the I/O interface of the tamper detection circuitry 502. The data may be analyzed at the external device, and instructions to shut down one or more components of the payment reader may be received at the I/O interface of the tamper detection circuitry 502. In some embodiments, tamper detection logic 532 may shut off components in response to certain types of tamper events (e.g., an apparent open circuit at a tamper detection device) while offloading determination of the tamper event to an external device in other circumstances (e.g., transient signals or waveform changes). In some embodiments, the tamper detection logic 532 can continuously or periodically transmit data to an external device, which can store the data and perform complex analyses regarding the data (e.g., using machine learning to identify patterns based on data received over time, or from multiple payment readers).

Figure 6:
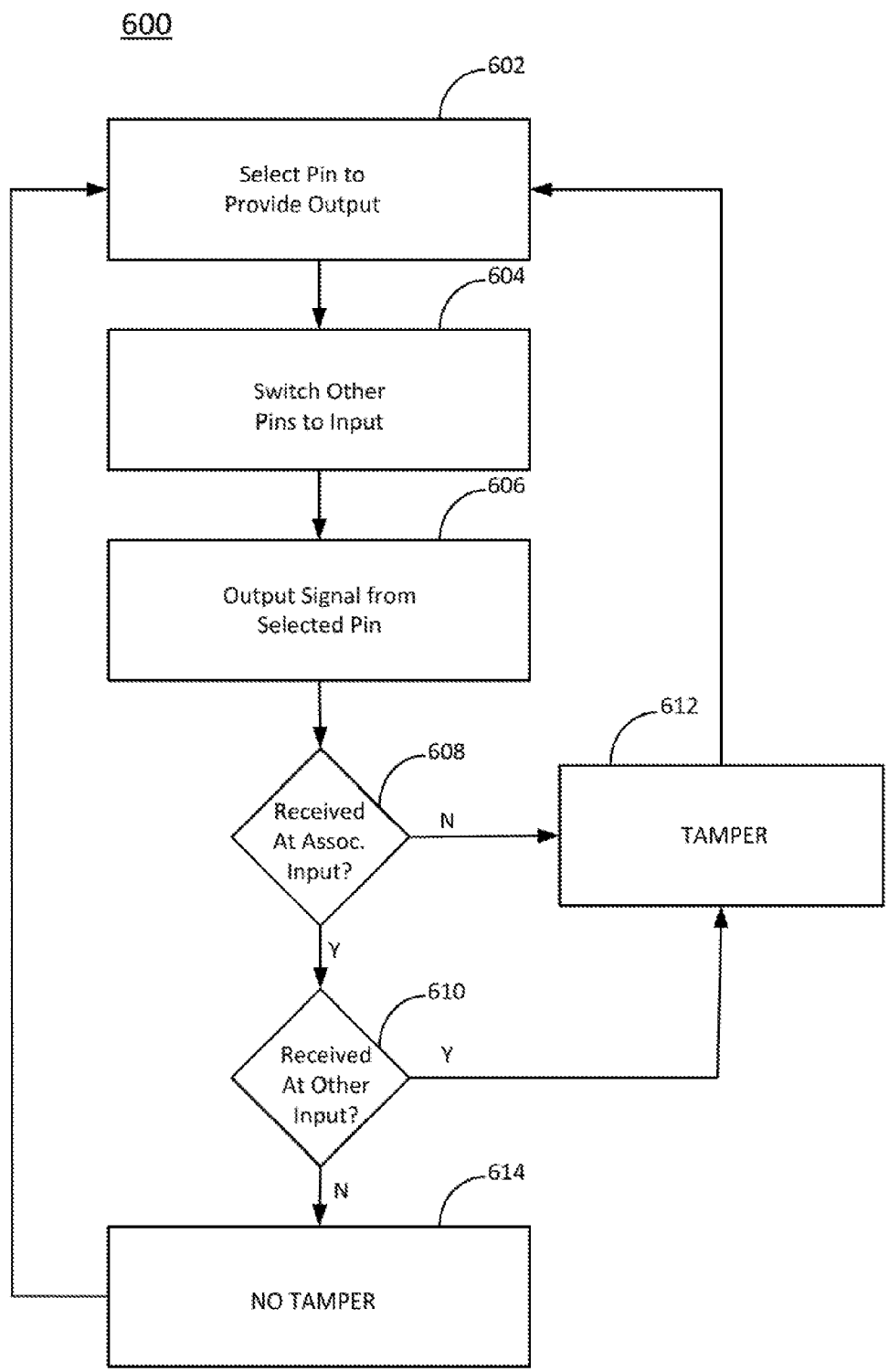
FIG. 6 depicts a non-limiting flow diagram illustrating exemplary steps for operating a tamper detection system in accordance with some embodiments of the present disclosure.
Figure 9:
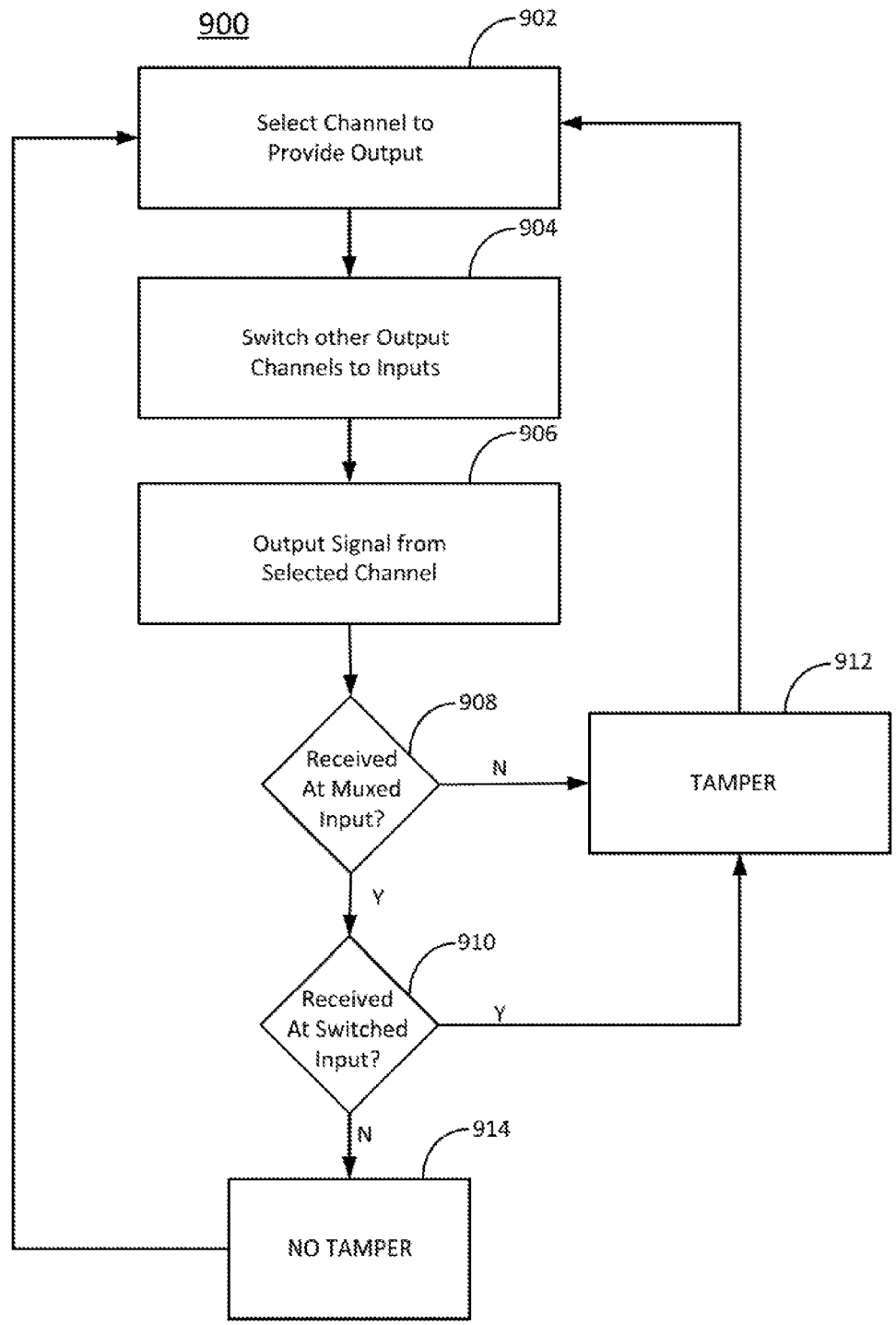
FIG. 9 depicts a non-limiting flow diagram illustrating exemplary steps for operating a multiplexed tamper detection system in accordance with some embodiments of the present disclosure.

In view of the structures and devices described supra, methods that can be implemented in accordance with the disclosed subject matter will be better appreciated with reference to the flowcharts of FIGS. 6 and 9. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 6 depicts steps 600 for or operating a tamper detection system in accordance with some embodiments of the present disclosure. In an embodiment, the steps of FIG. 6 may be directed to tamper detection devices that are normally closed, and that open in response to a tamper attempt. However, it will be understood that in some embodiments (not depicted in FIG. 6), a tamper attempt may be sensed in other manners as described herein. For example, in the case of normally open tamper detection devices, a tamper may be identified if a signal is received at an associated tamper input pin (e.g., at step 608), indicating a closed circuit as a result of a tamper event.

At step 602, tamper detection logic 532 may select one or more pins that should output a pulse. As described herein, in an embodiment, pulses may be sent randomly, such that tamper detection logic 532 may also randomly select that pin or pins that will provide the pulse. Although it will be understood that any suitable number of pins may transmit pulses at any one time, in an embodiment as described in FIG. 6, the random pulses may be mutually exclusive, such that only one tamper pin transmits a pulse at any one time. In one embodiment, tamper detection logic 532 may provide a pulse to tamper pin 504. Processing may then continue to step 604.

At step 604, the other tamper pins may switched to input pins. Although it will be understood that any other suitable number of the other tamper pins may be switched to inputs, in an exemplary embodiment where the pulse is provided to and output from tamper pin 504, the pulse may be provided to tamper detection device 520, and an associated tamper pin 514 may be coupled to a second electrical connection point of the tamper detection device 520 to receive the pulse in the absence of a tamper attempt. Thus, tamper pin 514 may be switched to an input. In an embodiment, the other tamper pins 506, 508, 510, and 512 may also be switched to input pins. Processing may then continue to step 606.

At step 606, the signal (e.g., the random pulse) may be output from the output tamper pin (e.g., tamper pin 504). The output pulse may then be provided to the tamper detection device 520. Processing may then continue to step 608.

At step 608, tamper detection logic 532 may determine whether the signal (e.g., the random pulse) was received by the associated tamper input pin. In the example described herein, tamper detection logic 532 may check the input at tamper pin 514, which should correspond to the pulse that was output from tamper pin 504 and received via tamper detection device 520. If the signal (e.g., a random pulse) was not received at the associated input tamper pin (e.g., tamper pin 514), this indicates that there is likely to be an open circuit as a result of a tamper event at the tamper detection device 520, and processing may continue to step 612. If the signal (e.g., a random pulse) was received at the associated input tamper pin (e.g., tamper pin 514), this indicates that there likely is not a tamper event at the tamper detection device 520, and processing may continue to step 610.

At step 610, tamper detection logic 532 may determine whether the signal (e.g., the random pulse), any other signal, an open circuit, or any other aberrant electrical signal, was received at any of the other tamper input pins. In the example described herein, tamper detection logic 532 may check the input at each of tamper pins 506, 508, 510, and 512. Under normal conditions, none of these inputs should receive a signal, since there is no output signal from an associated tamper pin (e.g., associated tamper pins 506 and 512 and associated tamper pins 508 and 510). Accordingly, if a signal is received at any of tamper pins 506, 508, 510, or 512, this may be indicative of a tamper attempt or an attempt to bypass a tamper detection device (e.g., as the result of a short circuit to tamper detection device 520 or tamper pin 504). If no signal (e.g., the random pulse, an open circuit, or any other signal) was received at the other tamper pins (e.g., tamper pins 506, 508, 510, or 512), this indicates that none of these pins has likely detected a tamper attempt or attempt to bypass tamper detection, and processing may continue to step 614. If an aberrant signal (e.g., the random pulse, an open circuit, or any other signal) was received at any of the other input tamper pins (e.g., tamper pins 506, 508, 510, or 512), this indicates that there likely was a tamper event or an attempt to bypass tamper detection, and processing may continue to step 612.

At step 612, tamper detection logic may respond to an indication of a tamper attempt, as described herein. In some embodiments, an indication of a tamper attempt from the associated tamper pin (e.g., tamper pin 514) or by any of the other tamper pins (e.g., tamper pins 506, 508, 510, or 512) may result in immediately shutting off power to one or more of the other components of payment reader 22. In other embodiments, certain types of tamper attempts (e.g., failure to receive a signal at tamper pin 514) may result in immediately shutting off power to one or more of the other components of payment reader 22, while other tamper attempts (e.g., an aberrant signal at one of tamper pins 506, 508, 510, or 512) may result in data about the tamper event being transmitted to another component of payment reader 22 or other device such as merchant device 29 or payment system 40. Based on communications with the external component or device, power to one or more components of the payment reader 22 may be shut off. In some embodiments, processing may return to step 602, at which another random pulse may be generated and provided to one of the tamper pins.

At step 614, tamper detection logic may respond to an indication of no tamper attempt, as described herein. In some embodiments, an indication of no tamper attempt from the associated tamper pin (e.g., tamper pin 514) or by any of the other tamper pins (e.g., tamper pins 506, 508, 510, or 512) may result in processing continuing, with the next random pulse provided to a tamper pin at step 602. In some embodiments, data about the received signals may be provided to another component of payment reader 22 or other device such as merchant device 29 or payment system 40. Processing may then return to step 602, at which another random pulse may be generated and provided to one of the tamper pins.

Figure 7:
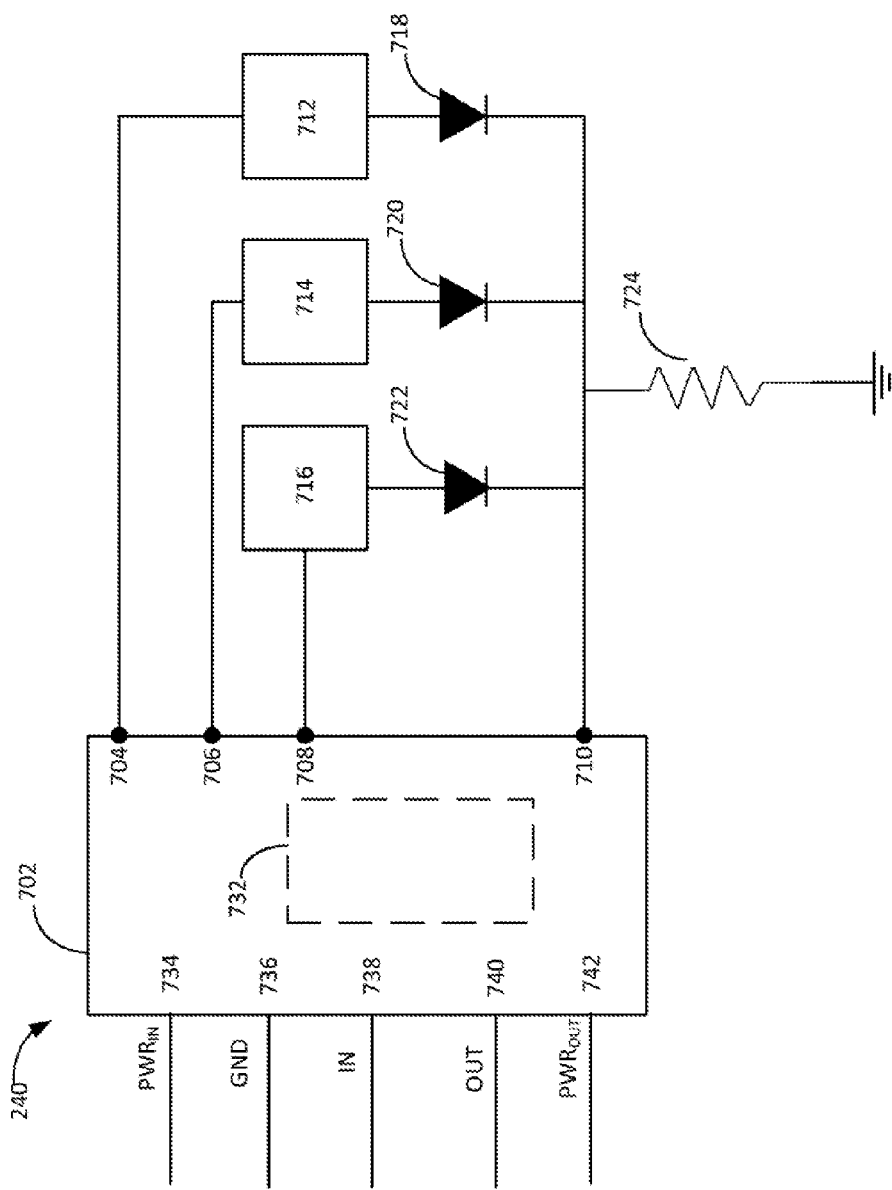
FIG. 7 depicts an exemplary multiplexed tamper detection system in accordance with some embodiments of the present disclosure.

FIG. 7 depicts an additional embodiment of an exemplary tamper detection system 240 in accordance with some embodiments of the present disclosure, the tamper detection system 240 including a multiplexed tamper detection pin 710. Although a tamper detection system including a multiplexed tamper detection pin may be implemented in any suitable manner, in the embodiment depicted in FIG. 7 the tamper detection system 240 may include a single tamper detection pin 710 associated with three tamper signal pins 704, 706, and 708. In this manner, the number of pins required for the tamper detection system 240 may be reduced. It will be understood that any suitable number of tamper detection pins may be associated with any suitable number of tamper signal pins, thus reducing the overall pin count for the tamper detection system 240.

Although the tamper detection system 240 of FIG. 7 may include any suitable components in accordance with the present disclosure, in some embodiments, tamper detection system 240 may include tamper detection circuitry 702 and tamper detection devices 712, 714, and 716. Each of tamper detection devices 712, 714, and 716 may be any suitable tamper detection device such as tamper switches, tamper meshes, or any combination thereof. Although three tamper detection devices 712, 714, and 716 are depicted in FIG. 7, it will be understood that any suitable number of tamper detection devices, and any suitable combination of tamper detection device types, may be implemented within a tamper detection system 240 in accordance with the present disclosure.

Although tamper detection circuitry 702 may include any suitable components, in an embodiment, tamper detection circuitry may include tamper detection logic 732, tamper signal pins 704, 706, and 708, power input pin 734, ground pin 736, input signal pin 738, output signal pin 740, and power output pin 742. Tamper detection logic 732 may include hardware logic, software logic, or any suitable combination thereof (e.g., a processing unit in combination with memory and hardware logic) as described herein that performs the control, processing, communication, signal generation, and other functions necessary for the operation of the tamper detection system.

An exemplary tamper detection system 240 may also include a plurality of blocking components such as diodes 718, 720, and 722. The blocking component may be configured in any suitable manner, depending on the logic and configuration of the tamper detection system. In an embodiment with pulses that are high, each diode may associated with and have its anode coupled to a second electrical connection point of a respective tamper detection device 712, 714, and 716. The cathode of each of the diodes 718, 720, and 722 may be coupled to a resistor 724 (which may be coupled to ground) and tamper detection pin 710. In other embodiments (e.g., with low pulses), this configuration may be modified in any suitable manner, such as by coupling the resistor 724 to power and flipping the orientation (cathode and anode connections) of the diodes 718, 720, and 722. Although the present disclosure present disclosure describes the blocking components of as diodes, it will be understood that any suitable component that blocks the flow of current in the direction from the tamper detection pin 710 to tamper detection devices may be employed as a blocking component.

In some embodiments, tamper detection logic 732 generates signals such as sequences of pulses that are output to one or more of the tamper signal pins 704, 706, or 708. That sequence of pulses may be provided to a respective electrical connection point of a respective tamper detection device (e.g., tamper detection device 712, 714, and 716). Based on the type of tamper detection device employed, a tamper event may be determined based on the type of signal received at the tamper detection pin. In an embodiment of a normally closed tamper detection device, and in the absence of a tamper event, a signal should be received at the tamper detection pin 710. In an embodiment of a normally open tamper detection device, and in the absence of a tamper event, a signal should not be received at the tamper detection pin 710. Each of the diodes 718, 72, and 722 may prevent a sequence of pulses transmitted via one of the tamper signal pins and tamper detection devices from being transmitted to another of the tamper detection devices (e.g., if a pulse is transmitted from tamper signal pin 704 through tamper detection device 712 and diode 718, diodes 720 and 722 prevent that pulse from being transmitted to tamper detection devices 714 and 718).

Based on whether the sequence of pulses is received at tamper detection pin 710, and based on the type of tamper detection device employed, tamper detection logic 732 may determine that a tamper event has not occurred. In an embodiment with normally closed tamper detection devices, because tamper detection pin 710 is in electrical communication with each of the tamper detection devices 712, 714, and 716, it will receive a multiplexed sequence of pulses, corresponding to the pulses transmitted from each of tamper signal pins 704, 706, and 708. As described herein, in some embodiments complex sequences of random pulses may be transmitted from the tamper signal pins 704, 706, and 708. Tamper detection pin 710 may provide the multiplexed sequences of pulses to the tamper detection logic 732, which may demultiplex the sequences of pulses. Although the pulses may be demultiplexed by tamper detection logic 732 in any suitable manner, in some embodiments tamper detection logic 732 may know which pulses were transmitted at what times, and may demultiplex the received pulse sequence. However, it will be understood that any suitable multiplexing/demultiplexing scheme may be utilized by tamper detection logic 732, including schemes that utilize time, amplitude, frequency, waveform, any other suitable characteristic, or any combination thereof.

As described herein, attackers may identify ways to bypass tamper detection devices, such as mimicking sequences of pulses or bypassing tamper detection devices. In some embodiments, in addition to monitoring the received multiplexed signal at tamper detection pin 710, tamper detection logic 732 may utilize more complex tamper detection techniques in order to identify more sophisticated attacks. In an embodiment, tamper detection logic 732 may provide each sequence of pulses as a random sequence of pulses or random sequence of pulse amplitudes. Because the pulses are provided randomly, it may be more difficult for an attacker to mimic the sequence of pulses. In some embodiments, the sequence of pulses may also be provided to each of the tamper detection devices (e.g., tamper detection device 712, 714, and 716) at mutually exclusive times. In this manner, a transient voltage or short circuit caused by an attacker may be less likely to align with an expected pulse. In some embodiments, the tamper detection logic 732 may perform complex signal analysis on a received sequence of pulses. For example, by examining waveforms, voltages, frequencies, duty cycles, current, and other electrical characteristics of the received sequence of pulses, tamper detection logic 732 may identify sophisticated attacks. In some embodiments, tamper detection circuitry 702 may include additional circuitry to facilitate such analysis. It will also be understood that any combination of the techniques described herein may be utilized in accordance with the present disclosure.

In an embodiment, some or all of the tamper signal pins 704, 706, and 708 may operate in both an input state and an output state. This allows tamper detection logic 732 to identify aberrant signals that may occur when an attack is occurring, such as a signal associated with a short circuit. For example, an attacker might intentionally or accidentally cause short circuit while attempting to bypass a tamper detection device (e.g., tamper detection device 712). This short circuit might short to one of the other tamper detection devices (e.g., tamper detection device 714 or tamper detection device 716) or electrical traces or connections associated therewith. In a multiplexed system, this may result in the tamper detection pin (e.g., tamper detection pin 710) nonetheless receiving the sequence of pulses event though the tamper detection device (e.g., tamper detection device 712) has been tampered with via another of the tamper detection devices (e.g., tamper detection device 714) or associated electrical connections or traces.

In some embodiments, tamper detection logic 732 may provide random sequences of pulses or random sequences of pulse amplitudes at mutually exclusive times to each of the tamper signal pins 704, 706, and 708. Whenever one of the tamper signal pins (e.g., tamper signal pin 704) is transmitting the random sequence of pulses, each of the other tamper pins (e.g., tamper signal pins 706 and 708) may be switched to an input state. With such a sequence, only the tamper detection pin (e.g., tamper detection pin 710) should receive any signal (e.g., depending on the type of tamper detection device employed), which should be the sequence of pulses. If it does not receive the sequence of pulses (or does, in the case of a normally open tamper detection device), or if the received signal is aberrant in any way, tamper detection logic 732 may identify a tamper event. Similarly, none of the other tamper signal pins (e.g., tamper signal pins 706 and 708) should receive any input signal. If the sequence of pulses or any transient signal is received, this may indicate at tamper attempt or an attempt to bypass the tamper detection devices. Thus, by employing some or all of the non-transmitting tamper signal pins as inputs, different types of tamper attempts may be detected.

The sequence of pulses provided by the tamper detection circuitry 702 is also less predictable, because sensing occurs at some or all of the non-transmitting pins. In this manner, it may be more difficult for an attacker to mimic or bypass the tamper detection system 240. Although signals have been described as being random sequences of pulses provided at mutually exclusive times, it will be understood that any suitable signal and sequencing may be provided in accordance with the present disclosure. In some embodiments, tamper detection logic 732 may modify any suitable signal characteristic of the transmitted signals, including pulse width, waveform, duty cycle, frequency, type of signal (random vs. data), amplitude, or any other suitable signal characteristic. The tamper detection logic 732 may transmit signals from multiple tamper pins at the same time, and switch any suitable number of tamper pins to input pins at any suitable time. Any of these modifications may be done according to logic that introduces varying degrees of randomness, and which may be updated to implement routines for newly identified types of attacks.

In some embodiments, tamper detection circuitry 702 may include a power input 734, a ground 736, and a power output 742. In one embodiment, power input 734 and ground 736 may provide power to the tamper detection circuitry 702. Power output 742 may provide power to other components of the payment reader 22, such that in response to detection of a tamper even by tamper detection logic 732, power can be shut off to one or more components of payment reader 22. Tamper detection circuitry may also include input pin 738 and an output pin 740, to enable communications with other components of payment reader 22 (e.g., CPU0 206 or CPU1 208) or an external device (e.g., merchant device 29, payment server 40). Although input pin 738 and output pin 740 are depicted in FIG. 7, it will be understood that tamper detection circuitry 702 may communicate with an external device via any suitable physical or wireless interface using any suitable protocol.

By communicating with an external device, in some embodiments, some aspects of the tamper detection processing may be offloaded to the external components, device, or devices. In an embodiment, tamper detection logic 732 may collect data about tamper events and transmit the data to an external device via the I/O interface of the tamper detection circuitry 702. The data may be analyzed at the external device, and instructions to shut down one or more components of the payment reader may be received at the I/O interface of the tamper detection circuitry 702. In some embodiments, tamper detection logic 732 may shut off components in response to certain types of tamper events (e.g., an apparent open circuit at a tamper detection device) while offloading determination of the tamper event to an external device in other circumstances (e.g., transient signals or waveform changes). In some embodiments, the tamper detection logic 732 can continuously or periodically transmit data to an external device, which can store the data and perform complex analyses regarding the data (e.g., using machine learning to identify patterns based on data received over time, or from multiple payment readers).

Figure 8:
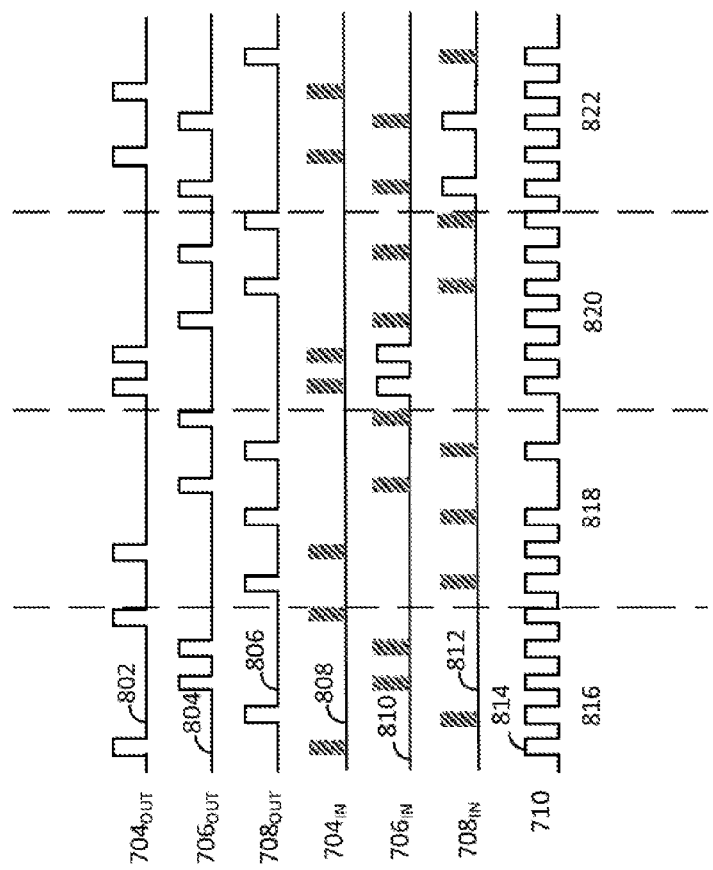
FIG. 8 depicts an exemplary signal diagram of a multiplexed tamper detection system in accordance with some embodiments of the present disclosure.

FIG. 8 depicts an exemplary signal diagram of the multiplexed tamper detection system 240 of FIG. 7 in accordance with some embodiments of the present disclosure. FIG. 8 depicts the outputs and inputs at each of the tamper signal pins 704, 706, and 708, as well as the input received at tamper detection pin 710, in a system having normally closed tamper detection devices. For ease of depiction and understanding, all of the pulses are depicted as square waves and propagation delays are not depicted in FIG. 8.

FIG. 8 depicts random sequences of pulses 802, 804, and 806 being output from each of tamper signal pins 704, 706, and 708 during four time sequences 816, 818, 820, and 822. The times where a sequence of pulses are being output correspond to time periods associated with each of the tamper signal pins, and are the only times when the tamper signal pins are functioning as outputs. Thus, input signals received during the time periods when a tamper signal pin is not transmitting a pulse are depicted as signals 808, 810, and 812. These signals are depicted with cross-hatching during the time periods when pulses are being transmitted, to depict when they are not operating as an input. Finally, signal 814 is the multiplexed signal received at tamper detection pin 710.

FIG. 8 also depicts four time sequences 816, 818, 820, and 822. During time sequence 816, a tamper event has not occurred at any tamper detection device, nor has there been an attempt to bypass or otherwise modify the operation of a tamper detection device. As is depicted in FIG. 8, the tamper signal pins do not receive any pulses while in the input mode. The multiplexed signal 814 receives all of the pulses, and the tamper detection logic 732 would not identify a tamper attempt.

During time sequence 818, a tamper event has occurred at tamper detection device 714, but there has not been an attempt to bypass or otherwise modify the operation of a tamper detection device, and thus there is no short in the tamper detection system 240. As is depicted in FIG. 8, the tamper signal pins do not receive any pulses while in the input mode. However, tamper detection signal 810 does not correspond to random sequence of pulses 804. The multiplexed signal 814 does not receive the pulses of random sequence of pulses 804, and the tamper detection logic 732 identifies a tamper attempt.

During time sequence 820, a tamper event has occurred at tamper detection device 712, and there has been an attempt to bypass or otherwise modify the operation of a tamper detection device resulting in a short of tamper detection device 714. The multiplexed signal 814 includes all of the random sequences of pulses, and thus tamper detection logic 732 fails to identify a tamper attempt. However, as is depicted by signal 810 in FIG. 8, during its input state tamper signal pin 706 receives random sequence of pulses 802 from tamper signal pin 704 as a result of the short. Because the tamper signal pins are switched to inputs when they are not transmitting, and tamper detection logic 732 is monitoring the tamper signal pins, the tamper attempt may be identified based on received signal at the tamper signal pin 706. Time sequence 822 is similar to time sequence 820, except that the tamper event has occurred at tamper detection device 714, and the pulses output from tamper signal pin 706 are received at the input of tamper signal pin 708.

FIG. 9 depicts steps 900 for or operating a tamper detection system such as that depicted in FIG. 7 in accordance with some embodiments of the present disclosure. In an embodiment, the steps of FIG. 9 may be directed to tamper detection devices that are normally closed, and that open in response to a tamper attempt. However, it will be understood that in some embodiments (not depicted in FIG. 9), a tamper attempt may be sensed in other manners as described herein. For example, in the case of normally open tamper detection devices, a tamper may be identified if a signal is received at an associated tamper detection pin (e.g., at step 908), indicating a closed circuit as a result of a tamper event.

At step 902, tamper detection logic 732 may select one or more pins that should output a pulse. As described herein, in an embodiment, pulses may be sent randomly, such that tamper detection logic 732 may also randomly select that pin or pins that will provide the pulse. Although it will be understood that any suitable number of pins may transmit pulses at any one time, in an embodiment as depicted in FIG. 9, the random pulses may be mutually exclusive, such that only one pin transmits a pulse at any one time. In one embodiment, tamper detection logic 732 may provide a pulse to tamper signal pin 704. Processing may then continue to step 904.

At step 904, the other tamper signal pins may switched to input pins. Although it will be understood that any other suitable number of the other tamper pins may be switched to inputs. In an exemplary embodiment where the pulse is provided to and output from tamper pin 704, the pulse may be provided to tamper detection device 712, which is coupled to the anode of diode 718 via a second electrical connection point of the tamper detection device 712, and from the cathode of diode 718 to the tamper detection pin 710 which will receive the pulse in the absence of a tamper attempt. All of the other tamper signal pins 706 and 708 may be switched to input pins. Processing may then continue to step 906.

At step 906, the signal (e.g., the random pulse) may be output from the output tamper signal pin (e.g., tamper signal pin 704). The output pulse may then be provided to the tamper detection device 712 and diode 718. Processing may then continue to step 908.

At step 908, tamper detection logic 732 may determine whether the signal (e.g., the random pulse) was received by the tamper detection pin 710. In the example described herein, tamper detection logic 732 may check the input at tamper detection pin 710, which should correspond to the pulse that was output from tamper signal pin 704 and received via tamper detection device 712 and diode 718. If the signal (e.g., a random pulse) was not received at the tamper detection pin 710, this indicates that there is likely to be an open circuit as a result of a tamper event at the tamper detection device 712, and processing may continue to step 912. If the signal (e.g., a random pulse) was received at the tamper detection pin 710, this indicates that there likely is not a tamper event at the tamper detection device 712, and processing may continue to step 910.

At step 910, tamper detection logic 732 may determine whether the signal (e.g., the random pulse), any other signal, an open circuit, or any other aberrant electrical signal, was received at any of the tamper signal pins that are operating as an input. In the example described in FIGS. 7-9, tamper detection logic 732 may check the input at each of tamper signal pins 706 and 708. Under normal conditions, none of these inputs should receive a signal, since there should only be a signal on these pins if a pulse is being output from the pins. Accordingly, if a signal is received at either of the tamper signal pins 706 or 708, this may be indicative of a tamper attempt or an attempt to bypass a tamper detection device (e.g., as the result of a short circuit to tamper detection device 712 or tamper signal pin 704). If no signal (e.g., the random pulse, an open circuit, or any other signal) was received at the other tamper signal pins (e.g., tamper signal pins 706 or 708), this indicates that none of these pins has likely detected a tamper event or attempt to bypass tamper detection, and processing may continue to step 914. If an aberrant signal (e.g., the random pulse, an open circuit, or any other signal) was received at any of the other input tamper signal pins (e.g., tamper signal pins 706 or 708), this indicates that there likely was a tamper event or an attempt to bypass tamper detection, and processing may continue to step 912.

At step 912, tamper detection logic may respond to an indication of a tamper attempt, as described herein. In some embodiments, an indication of a tamper attempt from the tamper detection pin 710 or by any of the tamper signal pins operating as an input (e.g., tamper signal pins 706 or 708) may result in immediately shutting off power to one or more of the other components of payment reader 22. In other embodiments, certain types of tamper attempts (e.g., failure to receive a signal at tamper detection pin 710) may result in immediately shutting off power to one or more of the other components of payment reader 22, while other tamper attempts (e.g., an aberrant signal at one of tamper signal pins 706 or 708) may result in data about the tamper event being transmitted to another component of payment reader 22 or other device such as merchant device 29 or payment system 40. Based on communications with the external component or device, power to one or more components of the payment reader 22 may be shut off. In some embodiments, processing may return to step 902, at which another random pulse may be generated and provided to one of the tamper signal pins.

At step 914, tamper detection logic may respond to an indication of no tamper attempt, as described herein. In some embodiments, an indication of no tamper attempt from the associated tamper pin (e.g., tamper pin 710) or by any of the other tamper pins (e.g., tamper pins 706 or 708) may result in processing continuing, with the next random pulse provided to a tamper pin at step 902. In some embodiments, data about the received signals may be provided to another component of payment reader 22 or other device such as merchant device 29 or payment system 40. Processing may then return to step 902, at which another random pulse may be generated and provided to one of the tamper signal pins.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A tamper detection system of a payment processing system, comprising:
    a first tamper detection device having a first electrical connection point and a second electrical connection point, wherein the first tamper detection device is configured to open a circuit between the first electrical connection point and the second electrical connection point in response to a first tamper event;
    a second tamper detection device having a third electrical connection point and a fourth electrical connection point, wherein the second tamper detection device is configured to open a circuit between the third electrical connection point and the fourth electrical connection point in response to a second tamper event;
    a first diode, wherein an anode of the first diode is coupled to the second electrical connection point of the first tamper detection device;
    a second diode, wherein an anode of the second diode is coupled to the fourth electrical connection point of the second tamper detection device; and
    tamper detection circuitry, comprising:
        tamper detection logic configured to provide a first sequence of pulses during first time periods and a second sequence of pulses during second time periods;
        a first tamper signal pin coupled to the first electrical connection point of the first tamper detection device and configured to output the first sequence of pulses;

a second tamper signal pin coupled to the third electrical connection point of the second tamper detection device and configured to output the second sequence of pulses; and a tamper detection pin coupled to the cathode of the first diode and the cathode of the second diode, wherein the tamper detection logic is configured to receive a combined signal from the tamper detection pin based on a signal at each of the cathode of the first diode and the cathode of the second diode, and wherein the tamper detection logic is configured to identify the tamper attempt based on a comparison of the combined signal to the first sequence of pulses and the second sequence of pulses.

2. The tamper detection system of claim 1, wherein each of the first sequence of pulses and the second sequence of pulses comprises a random sequence of pulses or a random sequence of pulse amplitudes.

3. The tamper detection system of claim 1, further comprising a resistor coupled on one end to a ground and coupled on the other end to the cathode of the first diode, the cathode of the second diode, and the tamper detection pin.

4. The tamper detection system of claim 1, wherein the first tamper signal pin is configured to operate in an output state during the first time periods and an input state during other time periods, wherein the second tamper signal pin is configured to operate in an output state during the first time periods and an input state during other time periods, and wherein the tamper detection logic is configured to identify the tamper attempt if any electrical signal is received at the first tamper signal pin during its input state or if any electrical signal is received at the second tamper signal pin during its input state.

5. A tamper detection system, comprising:
a first tamper detection device having a first electrical connection point and a second electrical connection point, wherein the first tamper detection device is configured to modify its electrical state in response to a first tamper event;
a second tamper detection device having a third electrical connection point and a fourth electrical connection point, wherein the second tamper detection device is configured to modify its electrical state in response to a second tamper event;
a first blocking component configured to block current flow to the second electrical connection point of the first tamper detection device;
a second blocking component configured to block current flow to the fourth electrical connection point of the second tamper detection device; and
tamper detection circuitry, comprising:
tamper detection logic configured to provide a first sequence of pulses during first time periods and a second sequence of pulses during second time periods;
a first tamper signal pin coupled to the first electrical connection point of the first tamper detection device and configured to output the first sequence of pulses;
a second tamper signal pin coupled to the third electrical connection point of the second tamper detection device and configured to output the second sequence of pulses; and
a tamper detection pin coupled to the first blocking component and the second blocking component, wherein the tamper detection logic is configured to receive a combined signal from the tamper detection pin based on a signal at each of the first blocking component and the second blocking component, and wherein the tamper detection logic is configured to identify a tamper attempt based on a comparison of the combined signal to the first sequence of pulses and the second sequence of pulses.

6. The tamper detection system of claim 5, wherein the first tamper detection device is configured to modify its electrical state by opening a circuit between the first electrical connection point and the second electrical connection point in response to the first tamper event and wherein the second tamper detection device is configured to modify its electrical state by opening a circuit between the third electrical connection point and the fourth electrical connection point in response to the second tamper event.

7. The tamper detection system of claim 5, wherein each of the first sequence of pulses and the second sequence of pulses comprises a random sequence of pulses or a random sequence of pulse amplitudes.

8. The tamper detection system of claim 5, wherein the first tamper signal pin is configured to operate in an output state during the first time periods and an input state during other time periods, wherein the second tamper signal pin is configured to operate in an output state during the second time periods and an input state during other time periods, and wherein the tamper detection logic is configured to identify the tamper attempt based on an electrical signal received at the first tamper signal pin during its input state or based on an electrical signal received at the second tamper signal pin during its input state.

9. The tamper detection system of claim 5, wherein the first tamper detection device and the second tamper detection device each comprise an anti-tamper mesh.

10. The tamper detection system of claim 5, wherein the first blocking component comprises a first diode and the second blocking component comprises a second diode.

11. The tamper detection system of claim 10, further comprising a resistor coupled on one end to ground or power and coupled on the other end to the first diode, the second diode, and the tamper detection pin.

12. The tamper detection system of claim 5, wherein the first time periods and the second time periods are mutually exclusive.

13. A tamper detection circuitry, comprising:
tamper detection logic configured to provide a first sequence of pulses during first time periods and a second sequence of pulses during second time periods;
a first tamper signal pin configured to output the first sequence of pulses;
a second tamper signal pin configured to output the second sequence of pulses; and
a tamper detection pin coupled to a first blocking component and a second blocking component and configured to receive a combined signal via the first blocking component and the second blocking component, wherein the tamper detection logic is configured to receive the combined signal from the tamper detection pin and to identify a tamper attempt based on a comparison of the combined signal to the first sequence of pulses and the second sequence of pulses; wherein the first tamper signal pin is configured to operate in an output state during the first time periods and an input state during other time periods, wherein the second tamper signal pin is configured to operate in an output state during the second time periods and an input state during other time periods, and wherein the tamper detection logic is configured to identify the tamper attempt based on an electrical signal received at the first tamper signal pin during its input state or an electrical signal received at the second tamper signal pin during its input state.

14. The tamper detection circuitry of claim 13, wherein each of the first sequence of pulses and the second sequence of pulses comprises a random sequence of pulses or a random sequence of pulse amplitudes.

15. The tamper detection circuitry of claim 13, wherein the first time periods and the second time periods are mutually exclusive.

16. The tamper detection circuitry of claim 13, further comprising:
a first tamper detection device having a first electrical connection point coupled to the first tamper signal pin and a second electrical connection point coupled to the first blocking component, wherein the first tamper detection device is configured to modify its electrical state in response to a first tamper event; and
a second tamper detection device having a third electrical connection point coupled to the second tamper signal pin and a fourth electrical connection point coupled to the second blocking component, wherein the second tamper detection device is configured to modify its electrical state in response to a second tamper event, wherein the first blocking component is configured to block current flow to the second electrical connection point of the first tamper detection device and wherein the second blocking component is configured to block current flow to the fourth electrical connection point of the second tamper detection device.

17. The tamper detection circuitry of claim 16, wherein the first tamper detection device is configured to modify its electrical state by opening a circuit between the first electrical connection point and the second electrical connection point in response to the first tamper event and wherein the second tamper detection device is configured to modify its electrical state by opening a circuit between the third electrical connection point and the fourth electrical connection point in response to the second tamper event.

18. The tamper detection circuitry of claim 16, wherein the first tamper detection device and the second tamper detection device each comprise an anti-tamper mesh.

19. The tamper detection circuitry of claim 13, wherein each of the first blocking component and the second blocking component comprises a diode.

20. The tamper detection circuitry of claim 19, further comprising a resistor coupled on one end to ground or power and coupled on the other end to the first diode, the second diode, and the tamper detection pin.

21. A method for identifying a tamper attempt, the method comprising:
generating, from tamper detection logic, a first sequence of pulses during first time periods and a second sequence of pulses during second time periods;
outputting, from a first tamper signal pin, the first sequence of pulses during the first time periods;
outputting, from a second tamper signal pin, the second sequence of pulses during the second time periods;
operating a tamper detection pin in an input state;
receiving, at the tamper detection pin, a combined signal via a first blocking component and a second blocking component;
processing, by the tamper detection logic, the combined signal;
determining, by the tamper detection logic, whether the tamper attempt has occurred based on a comparison of the processed combined signal to the first sequence of pulses and the second sequence of pulses;
switching the first tamper signal pin from an output state to an input state during time periods other than the first time periods;
switching the second tamper signal pin from an output state to an input state during time periods other than the second time periods; and
determining, by the tamper detection logic, that the tamper attempt has occurred based on an electrical signal received at the first tamper signal pin during its input state or based on an electrical signal received at the second tamper signal pin during its input state.

22. The method of claim 21, wherein each of the first sequence of pulses and the second sequence of pulses comprises a random sequence of pulses or a random sequence of pulse amplitudes.

23. The method of claim 21, wherein the first time periods and the second time periods are mutually exclusive.

24. The method of claim 21, wherein outputting the first sequence of pulses comprises outputting the first sequence of pulses to a first tamper detection device having a first electrical connection point coupled to the first tamper signal pin and a second electrical connection point coupled to the first blocking component, wherein outputting the second sequence of pulses comprises outputting the second sequence of pulses to a second tamper detection device having a third electrical connection point coupled to the second tamper signal pin and a fourth electrical connection point coupled to the second blocking component, wherein the first blocking component is configured to block current flow to the second electrical connection point of the first tamper detection device, and wherein the second blocking component is configured to block current flow to the fourth electrical connection point of the second tamper detection device, further comprising:
modifying an electrical state of the first tamper detection device in response to a first tamper event; and
modifying an electrical state of the second tamper detection device in response to a second tamper event.

25. The method of claim 24, wherein modifying the electrical state of the first tamper detection device comprises opening a circuit between the first electrical connection point and the second electrical connection point in response to the first tamper event, and wherein modifying the electrical state of the second tamper detection device comprises opening a circuit between the third electrical connection point and the fourth electrical connection point in response to the second tamper event.

26. The method of claim 24, wherein the first tamper detection device and the second tamper detection device each comprise an anti-tamper mesh.

27. The method of claim 21, wherein the first blocking component comprises a first diode and the second blocking component comprises a second diode.

28. The method of claim 27, further comprising providing an electrical signal between one or more of the first diode and the second diode, and a resistor coupled on one end to ground or power and coupled on the other end to the first diode, the second diode, and the tamper detection pin.

* * * * *